April 30, 1968 — J. CUGINI — 3,380,599
CHARGING MACHINE FOR FURNACES
Filed Jan. 14, 1966 — 6 Sheets-Sheet 1

INVENTOR.
Joseph Cugini
BY Green, McCallister & Miller
HIS ATTORNEYS

INVENTOR.
Joseph Cugini

HIS ATTORNEYS

INVENTOR.
Joseph Cugini

HIS ATTORNEYS

INVENTOR.
Joseph Cugini

BY Green, McCallister & Miller

HIS ATTORNEYS

April 30, 1968 J. CUGINI 3,380,599
CHARGING MACHINE FOR FURNACES
Filed Jan. 14, 1966 6 Sheets-Sheet 6
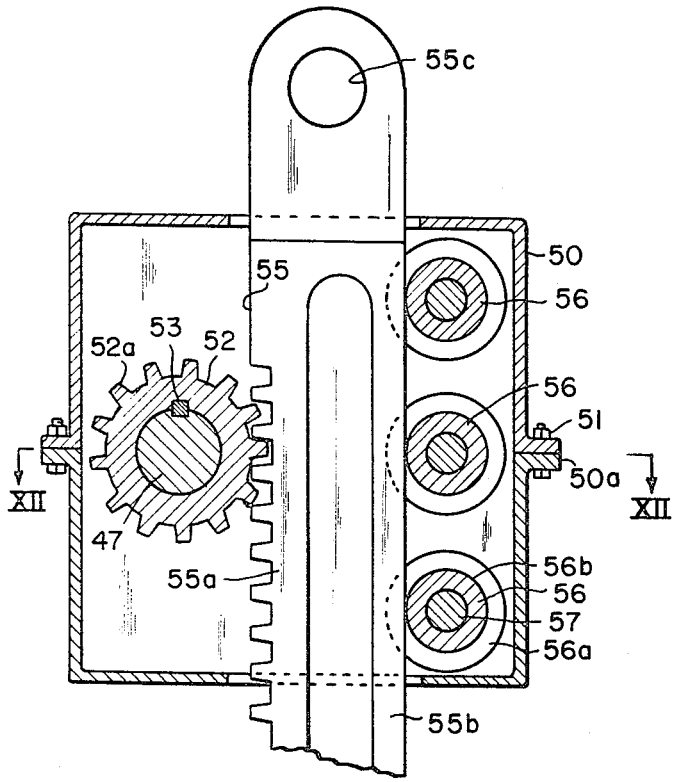
Fig. 11
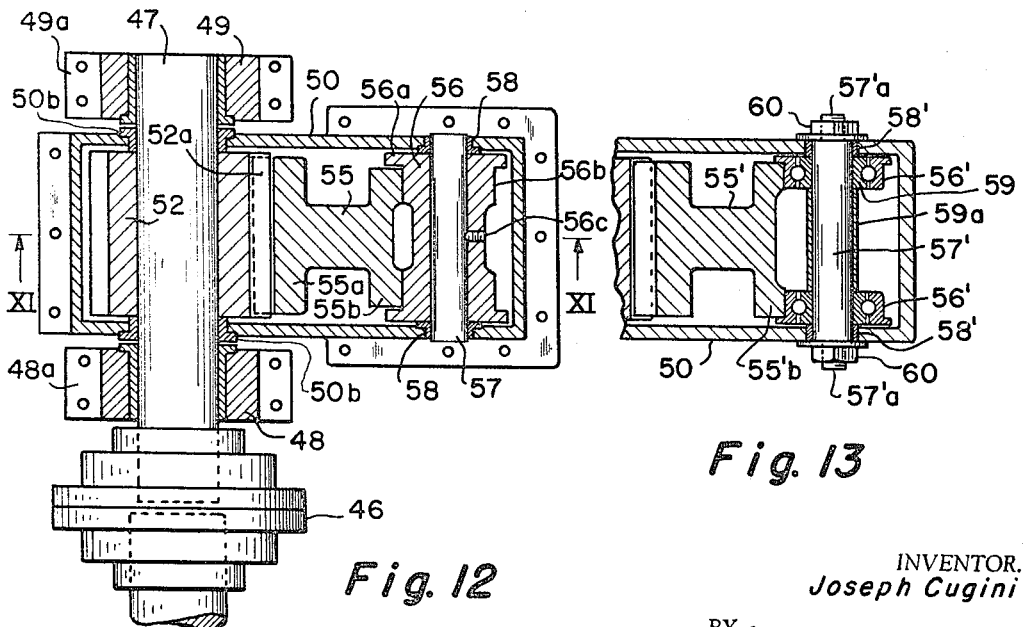
Fig. 12
Fig. 13
INVENTOR.
Joseph Cugini
BY Geen, McCallister & Miller
HIS ATTORNEYS United States Patent Office 3,380,599
Patented Apr. 30, 1968

3,380,599
CHARGING MACHINE FOR FURNACES
Joseph Cugini, New Castle, Pa., assignor to Pennsylvania Engineering Corporation, New Castle, Pa., a corporation of Pennsylvania
Filed Jan. 14, 1966, Ser. No. 520,705
5 Claims. (Cl. 214—18)

ABSTRACT OF THE DISCLOSURE

A scrap charging machine is provided that has a cradle frame for carrying a scrap box thereon. The cradle frame is pivotally-mounted adjacent its front end on a carriage frame of the machine and is tilted by a vertically-extending rack. The machine is adapted to be moved on a track to and from a furnace charging position. The rack is, at its upper end, pivotally-secured to a bifurcated fixed mount on a back end portion of the cradle frame and extends downwardly adjacent a back end portion of and within the charging machine through an open top end portion in alignment with the open bottom end portion of a swing housing for non-pivoting up and down or vertical movement therein and for swinging movement therewith. A motor drive mechanism including a speed reduction unit is carried on a superstructure of the carriage frame adjacent its back end and is operatively-connected to an output drive shaft that is journaled within bearing stands or fixed position supports on the structure. The drive shaft extends transversely and vertically-centrally through a back end portion of the swing housing and swingably or pivotally carries the housing thereon. A drive pinion is centrally-secured on the drive shaft within the housing and is adapted to mesh with gear teeth extending along a toothed back face of a lower end portion of the rack for tilting the carriage frame and the scrap box.

The drive shaft and the pinion thereon are positioned on a transverse or horizontal axial plane, and a group of at least three guide roller means are rotatably-positioned on vertically-aligned, transverse axial planes within the front end portion of the housing along an opposite, smooth, front face of the rack and in guiding engagement therewith. The group of roller means define a central vertical pass with the drive pinion along which the rack extends. A central guide roller means is located on the same horizontal or transverse axial plane as the drive shaft and the pinion and in a directly opposed relation therewith, an upper guide roller means has an upwardly-spaced relation with respect to the central guide roller means, and a lower guide roller means has a downwardly-spaced relation with respect to the central means. The rack is of I beam shape or section and its toothed back face is represented by a back flange and its smooth front face is represented by a front flange. Each guide roller means has flanged end portions overlapping adjacent opposite side edges of the front flange of the rack, and has a central portion that engages the front face of the front flange of the rack in such a manner as to positively retain the rack throughout its operation in a non-pivoting operating relation within the swing housing and in efficient meshing engagement with the drive pinion and, at the same time, permit the rack to pivot with the housing about the drive pinion during its actuation.

This invention relates to apparatus for charging or feeding furnaces and particularly, to a charging machine or device having improved means for tilting charging boxes, such as scrap boxes, for introducing scrap or cold charging material into melting and refining furnaces. Apparatus of this type has particular application to steel processing furnaces in which scrap or other charging materials may be introduced, for example, through an opening in the roof of an open hearth furnace or into the open mouth portion of a Bessemer or oxygen converter vessel.

The tendency in recent years has been to increase the size of oxygen converter furnaces such that their sizes may vary from 20 to 30 tons capacity up to 300 tons or more. It will be apparent that the furnaces require heavy equipment for charging them and equipment of such a type that will minimize the number of charging operations. Thus, as a result, there has been a tendency to increase the size of the charging boxes and to endeavor to provide a charging machine that will have the ability of handling boxes of sufficient capacity to fully charge a furnace with the scrap material that is required. Heretofore, due to the great weight of the charges and of means for carrying and discharging the charge material, it has been customary to employ hydraulic lifting mechanism which entails the use of hydraulic equipment, including fluid lines, valves, pumps, etc.

It has thus been an object of my invention to provide a charging machine which can fully effect its operations mechanically and particularly, the operation of tilting or swinging charging box means carried thereby;

Another object of my invention has been to develop an improved and simplified type of furnace charging machine or apparatus that will enable the effective use of heavy charging equipment and heavy charging loads;

A further object of my invention has been to eliminate the need for hydraulic means for swinging a scrap box in a cradle frame in connection with a furnace charging operation;

These and other objects of my invention will appear to those skilled in the art from the illustrated embodiments and the description thereof.

In the drawings, FIGURE 1 is a side view in elevation of an apparatus or charging machine constructed in accordance with my invention, showing it in an initial scrap box carrying position and in alignment with an open mouth portion of a converter vessel or furnace that has been slightly tilted to a suitable charging position;

FIGURE 2 is a side view in elevation on the scale of FIGURE 1 in which a lower portion of the machine or apparatus has been omitted for simplicity and other parts such as guide rollers have been omitted for the same purpose; this view is introduced to particularly illustrate a tilted or charging position of the apparatus at which charging materials may be introduced into a furnace vessel;

FIGURE 3 is a front end view in elevation on the scale of FIGURES 1 and 2, showing a pair of machines or charging units of my construction assembled for cooperative operation, in order to provide charging materials from a pair of scrap boxes; this figure illustrates the adaptability of a machine of my construction wherein an individual unit may be secured or coupled to an adjacent unit for unitized movement on a shop floor for cooperative utilization in charging a relatively large furnace or a group of smaller furnaces;

FIGURE 11 is an enlarged fragmental side section in elevation, on the scale of FIGURE 5, showing details of mechanical tilting mechanism for swinging the cradle frame and a scrap box carried thereby;

FIGURE 12 is a horizontal section taken along the line XII—XII of and on the same scale as FIGURE 11;

FIGURE 13 is a fragmental horizontal section similar to FIGURE 12, but showing a modified construction and mounting of guide wheels or rollers for the tilting mechanism.

Figure 1:
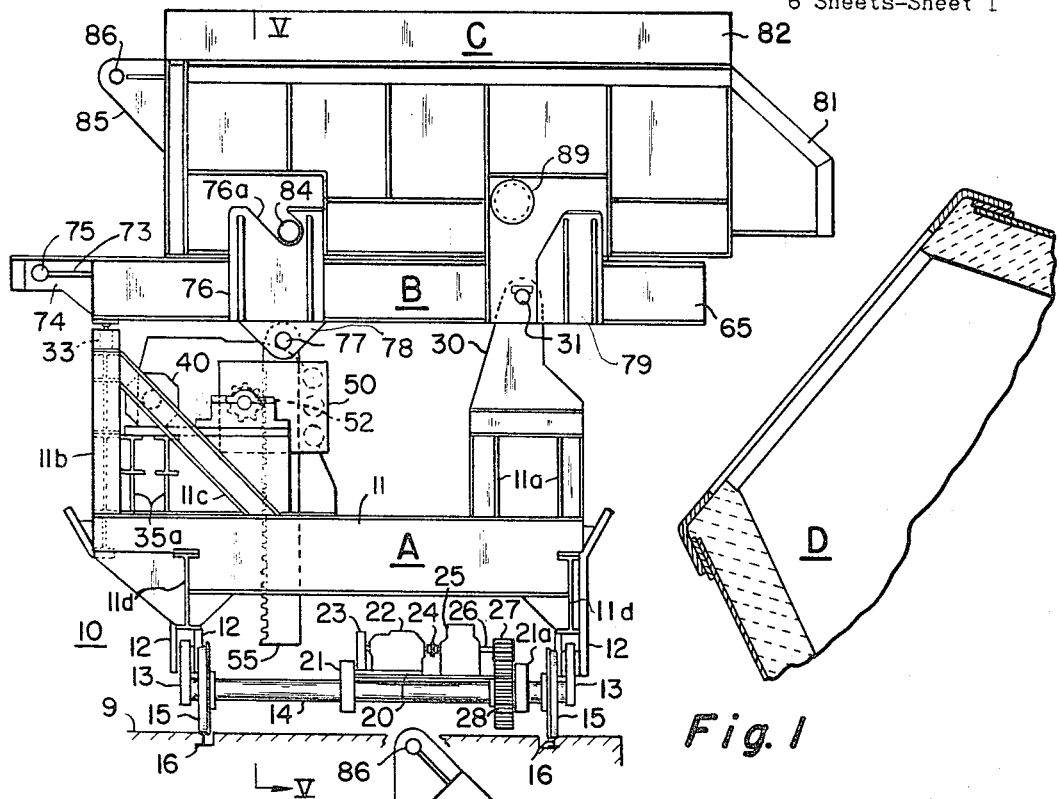
Figure 2:
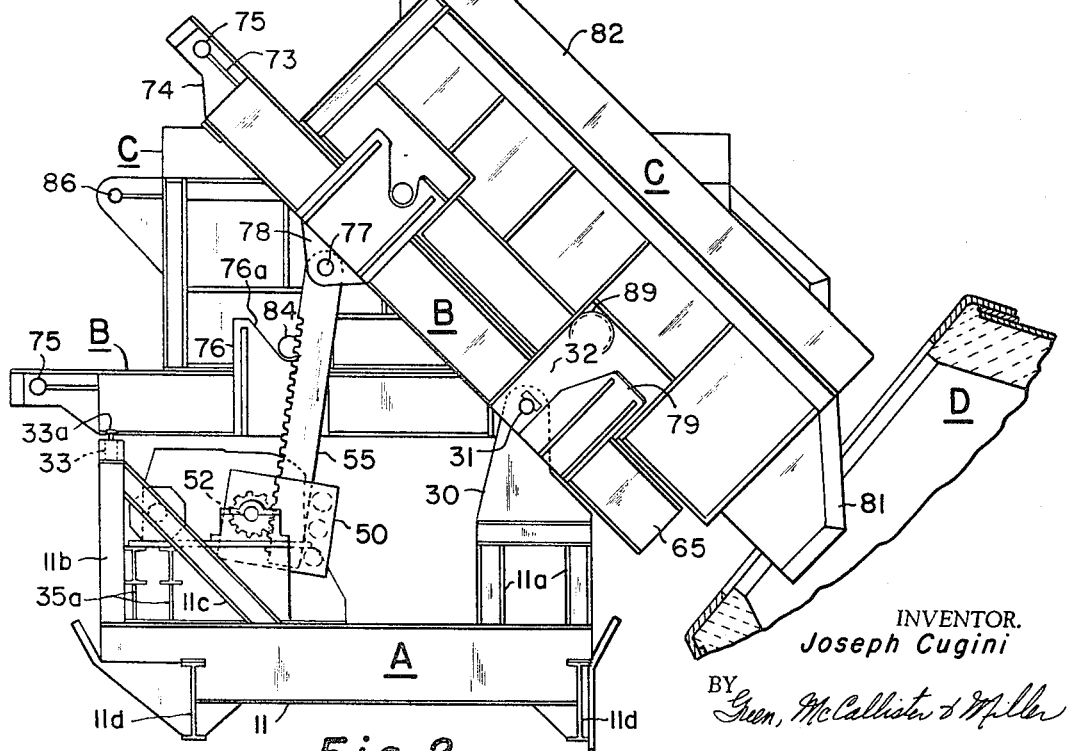

In carrying out my invention, I employ a charging apparatus, machine, device or unit 10 which is adapted to move along sidewise, from the standpoint of its material delivery end or transversely with respect to the open portion of a furnace D to be charged, on rails 16 laid along a floor 9 of the plant. The machine is shown provided with a wheeled truck 13 that is energized by an electric motor unit carried by the machine. The charging machine 10 has a bottom main or carriage frame A of a stationary nature which has a platform 36 for supporting actuating means for swinging a cradle frame B with respect thereto. The cradle frame B is adapted to position and removably-receive a scrap or charging box C and to tilt it from a horizontal carrying position (such as shown in FIGURE 1 to an endwise or forwardly-declining, delivering or charging position (such as shown in FIGURE 2). It will be noted that the cradle frame B is adapted to be tilted or pivoted about a front end portion of the carriage or main frame A by means of a back-positioned, vertically-projecting rack 55 that is actuated by a drive pinion 52. It will also be noted (see FIGURES 1 and 6) that the gear teeth along one face, edge or flange portion 55a of the rack 55 are adapted to be held in an operating, engaging or meshing relation with an actuating drive pinion or gear means 52 by means of guide rollers or wheels 56, and within a swing housing 50.

Figure 3:
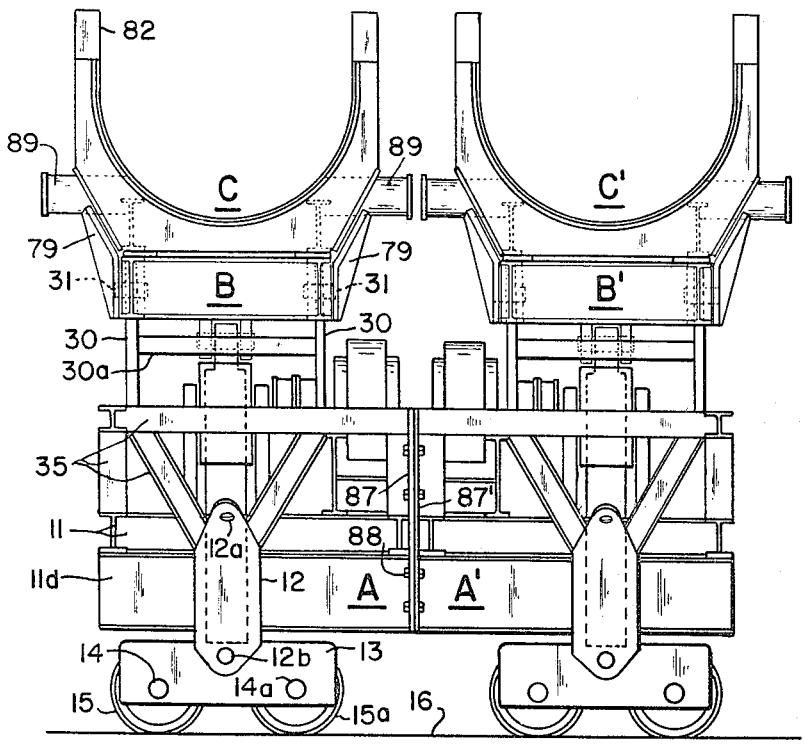

Referring particularly to FIGURES 1 and 3 of the drawings, the carriage frame A of the machine 10 has a frame made up of I-beam members 11. The back end of the carriage frame A has a vertical frame structure or portion 11b that supports a back end portion of the cradle or swing frame B, and the front end has a vertical frame structure or portion 11a that pivotally or swingably carries and supports a front end portion of the cradle frame B. The frame portion 11a has a pair of transversely spaced-apart swing stands or wings 30 that project upwardly therefrom to swingably-support the cradle frame B. The back frame 11b is reinforced by an inwardly-declining, bracing frame structure or portion 11c.

The carriage frame A, at its opposite ends, also carries downwardly-projecting or under-positioned end beam members 11d for providing a truck mounting. A pair of spaced-apart, downwardly-projecting plates 12 define bifurcated mounts 32 that are secured to the members 11d and that pivotally-carry wheeled truck 13 by means of pins 12b (see FIGURE 3). As shown particularly in FIGURE 1, the truck 13 has a pair of cross-extending, spaced-apart, axle shafts 14 and 14a journaled therein and on each of which pair of flanged wheels 15 and 15a are secured for rotation therewith. A platform 20 is mounted on and extends between the shafts 14 and 14a of the truck 13 by means of spaced-apart support members 21 and 21a through which the axle shafts 14 and 14a rotatably-extend. A drive motor 22, such as electric motor, is mounted on the platform 20 and its drive shaft is shown provided at its back end with an electric brake 23 and, at its front end, with a coupling 24 for connecting it through a gear reduction unit 25 to an output drive shaft 26. The output shaft 26 is a slow speed drive shaft extending from the gear reduction unit 25 and has a gear pinion 27 secured thereon and meshing with the teeth of a driven gear 28 which is shown secured on one of the axle shafts 14. It is thus apparent that actuation of the motor 22 will provide a controlled actuation of one shaft 14 and thus, movement of the truck 13 and its associated wheels along the rails 16.

Figure 10:
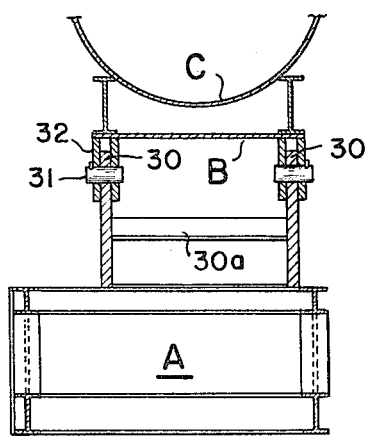
FIGURE 10 is a fragmental end section in elevation showing further details of the construction, taken in the same direction as FIGURE 3, and through a pivot axis of the cradle frame of and on the scale of FIGURE 4.

As particularly shown in FIGURES 3 and 10, the swing wings or stands 30 of the carriage frame A are reinforced by a cross extending or transverse, reinforcing member 30a and, at their upper end portions, carry a pair of pivot pin shafts 31. The cradle frame B has spaced-apart pairs of bifurcated mounts 32 which project downwardly therefrom adjacent its front end portion to fit over the upper end portions of the wings 30 and receive the pivot pin shafts 31, in order that the cradle frame B may be swung or tilted adjacent its front end in the manner shown in FIGURE 2.

Figure 6:
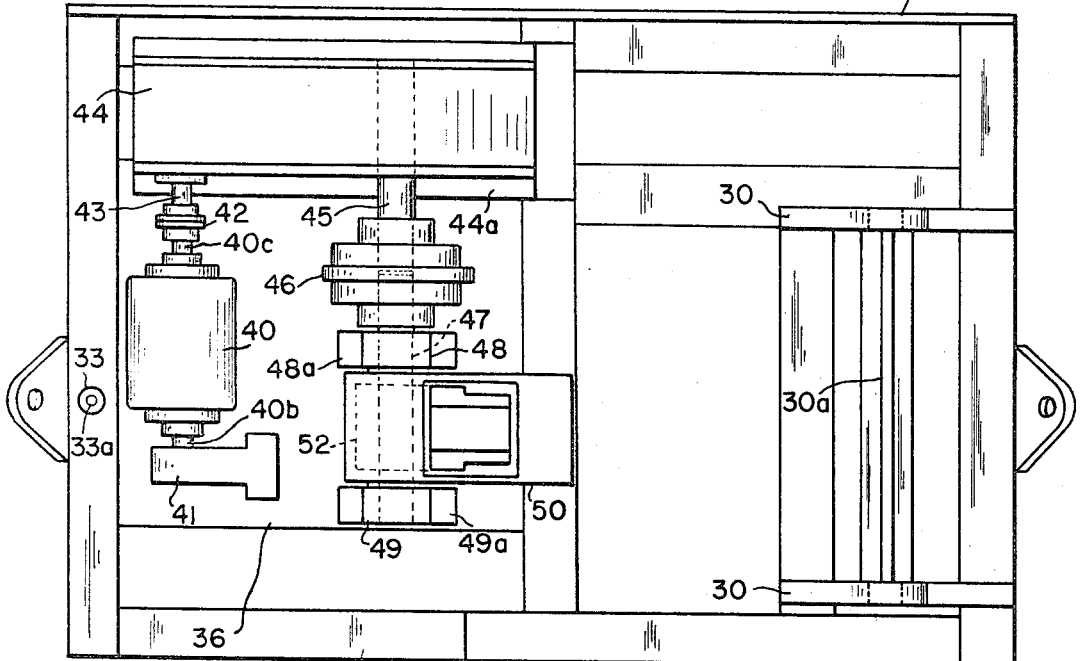
FIGURE 6 is a top plan view showing details of a carriage or operating mechanism positioning frame of the device of FIGURES 1 and 2, on a slightly reduced scale with respect to FIGURE 5.
Figure 7:
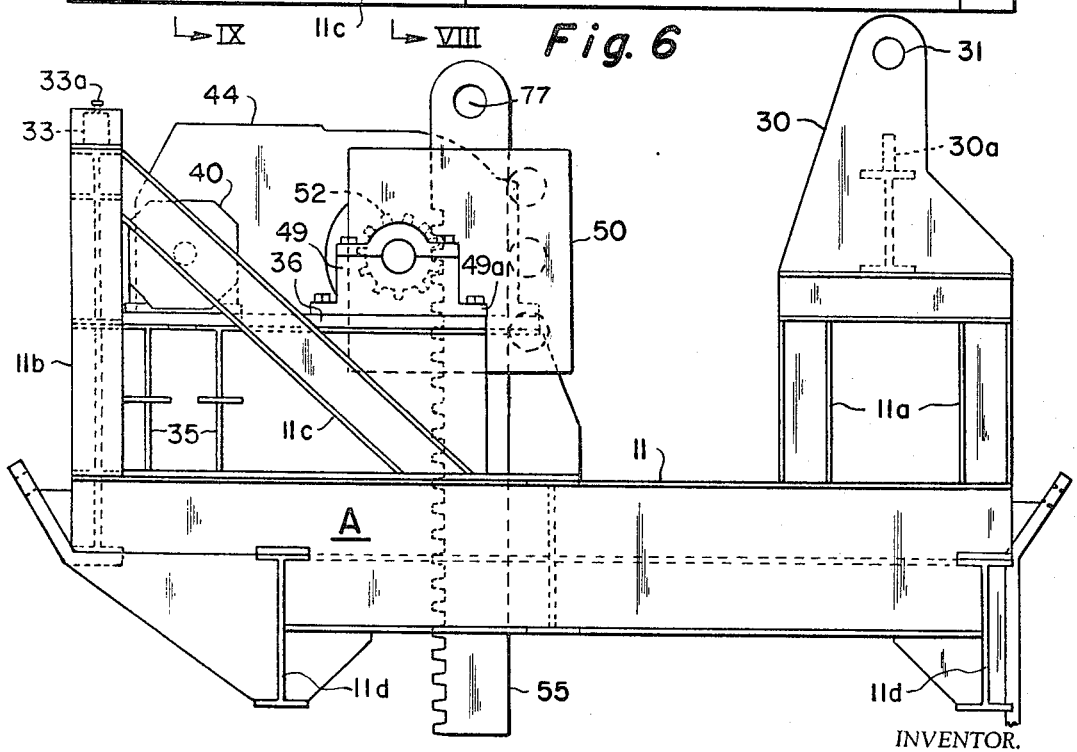
FIGURE 7 is a side view in elevation on the scale of FIGURE 6, taken in the same direction as FIGURES 1 and 2, and particularly illustrating the construction of the carriage frame of FIGURE 6.

It will be noted, as shown particularly in FIGURES 6 and 7, that the back end vertical frame 11b is provided with a centrally-positioned bumper 33 having an upwardly-projecting bumper tip 33a upon which the under part of the back end portion of the cradle frame B is adapted to rest when the frame is moved from its tilted position of FIGURE 2 to its normal horizontal or level position of FIGURE 1.

As shown particularly in FIGURE 3, the framing beam members 11 of the carriage frame A, along its opposite ends, may be provided with a superstructure 35 which projects upwardly therefrom. One (shown) or both (not shown) side ends of the superstructure 35 is provided with a vertical flange 87 or 87' which may be employed for connecting a pair of machines together. In this figure, bolt and nut assemblies 88 extend through abutting flanges 87 and 87' of carriage frames A and A' at opposite (front and back) ends of two machines to provide a unitized machine. In such a utilization, the motor 22 of one unit may be employed for moving both units or the motors of both units may be synchronized and energized for this purpose. The frame A also has a superstructure 35a for the platform 36.

Figures 8, 9:
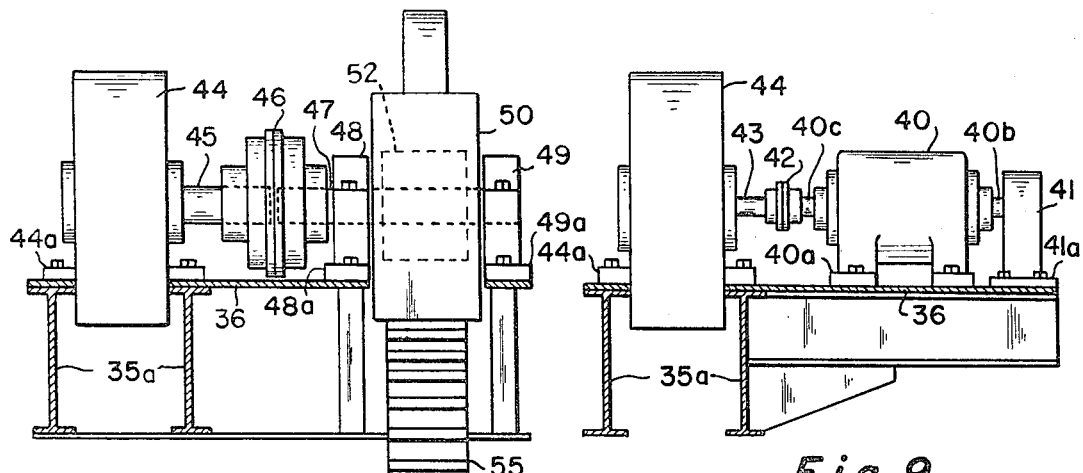
FIGURE 8 is a fragmental view in elevation and partial section, on the scale of FIGURE 5, and taken along the line VIII—VIII of FIGURE 6.
FIGURE 9 is a fragmental view in elevation and partial section, on the scale of FIGURE 8, and taken along the line IX—IX of FIGURE 6.

The platform 36 carries actuating mechanism for tilting or operating the cradle frame B. As shown particularly in FIGURES 6 and 7, an electromagnetic brake 41, an electric motor 40, a speed gear reduction unit 44, and stands 48 and 49 are positioned on the platform 36. Mounting flanges 40a of the motor 40, as shown in FIGURE 9, may be bolted to the frame 36. One shaft end portion 40b of the motor is provided with a brake drum that is employed with a conventional electro-magnetic brake unit 41. The brake unit 41 is bolted to the frame 36 by means of its mounting flange 41a.

Drive shaft end portion 40c of the motor 40 is connected through a coupling 42 to an input or high speed shaft 43 at one end of the gear reduction unit 44. The unit 44 is secured on the superstructure 35 by means of bolts extending through its mounting flange 44a (see FIGURE 9). As also shown in FIGURES 6 and 7, slow speed or output shaft 45 at the other end of the gear reduction unit 44 is, in turn, connected through a flexible coupling 46 to a rack operating or drive shaft 47. The shaft 47 is journaled within bearing stands 48 and 49 whose mounting flanges 48a and 49a (see FIGURE 8) are bolted on the platform 36.

As illustrated particularly in FIGURES 5, 6, 7 and 11 to 13, inclusive, the actuating or drive shaft 47 extends through a swing, rack guide casing or housing 50 that is journaled or pivotally-mounted thereon by sleeve bearings 50b (see particularly FIGURE 12). Within the housing 50 a rack actuating pinion or small gear 52 is secured on the shaft 47, as by a key 53 or feathering (see FIGURE 11) for rotation therewith. As also illustrated in the latter figure, the housing or rack casing 50 is of two-part construction, having central or intermediate, opposed flanges 50a which enable the parts to be removably-secured together by nut and bolt assemblies 51. This permits ready inspection for maintenance of the parts carried within the housing.

The teeth of pinion 52 are (as shown particularly in FIGURES 11 and 12) adapted to mesh-engage with tooth edge flange or face portion 55a of the vertically-positioned rack 55. Opposite edge flange or face portion 55b of the rack 55 is adapted to slidably-engage a group or set of back-up guide rollers, spools or idler wheels 56 that are also carried by and within the casing or housing 50. It will be noted, as shown particularly in FIGURE 11, that the rack-engaging rollers or wheels 56 are mounted in a vertically-spaced and aligned relation with each other by means of cross-extending pin shafts 57. As particularly illustrated in FIGURE 12, sleeve bearings 58 rotatably-journal opposite ends of the pin shafts 57 to extend across the housing 50.

As shown in detail in FIGURES 11 and 12, taken in view of FIGURES 1 and 2, the housing 50 is pivotally or swingably-mounted on the drive shaft 47 that extends transversely therethrough and that is mounted in fixed stands 48 and 49 on the superstructure of the carriage frame A, and the rack 55 is positively-guided and retained throughout its entire actuating movement in meshing engagement with the drive pinion 52 by the group of three guide rollers 56 which are rotatably-positioned within the housing 50 adjacent its front end portion.

As shown particularly in FIGURE 11, the drive shaft 47 and pinion 52 are mounted or extend on a transverse or horizontal axial plane adjacent the back toothed face 55a of the rack 55, and centrally-positioned guide roller 56 is mounted on the same plane in a directly opposed relation and in engagement with opposite or smooth front face of the rack. The upper guide roller 56 of the group is mounted on a transverse axial plane in an upwardly-spaced relation in vertical alignment with the central guide roller and also in engagement with the front face 55b of the rack 55. The bottom guide roller 56 is mounted on a transverse axial plane in a downwardly spaced relation in vertical alignment with the central roller and also in engagement with the front face 55b of the rack 55. The three guide rolls 56 have an operating relation with the rack 55 such as to positively retain it in operating engagement with the drive pinion 52 within the swing housing 50 during its actuation or up and down movement, such that it is not itself, permitted to swing or pivot within the housing during its swinging movement on the drive shaft 47.

Each roller 56 may be secured for rotation with its associated shaft 57 by means of a set screw 56c. Also, as particularly illustrated in FIGURES 11 and 12, each back-up roller or spool 56 has a pair of cylindrical or annular end flanges 56a which ride over opposed sides of the flange 55b of the rack 55, while their cylindrical or annular, central roller hub portions 56b ride along an edge face of the rack flange 55b. This gives a positively-guided sliding movement of the rack 55 when it is actuated upwardly and downwardly by the pinion 52. By swingably or rotatably mounting the housing or casing 50 on the drive shaft 47, it can turn or accommodate itself to inclination imparted to the rack 55 during the swinging or tilting operation in which the cradle frame B is moved from its horizontal position of FIGURE 1 to its forwardly-downwardly inclined or sloped position of FIGURE 2.

In the modification of FIGURE 13, I have provided each guide or back-up roller with a pair of flanged wheels 56' that are rotatably-mounted or journaled by roller bearing assemblies on end hubs 59 that may be secured in a fixed position on a cross-extending pin shaft 57'. A spacer sleeve 59a extends along the shaft 57' between the hubs 59. As a result of this type of construction, the shaft 57' may, as shown in FIGURE 13, be a stationary shaft secured at its threaded ends 57'a by nut and washer assemblies 60 on the casing or housing 50.

Figure 4:
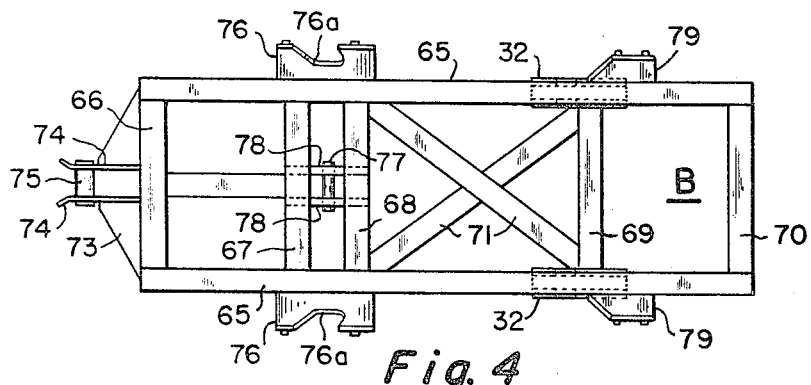
FIGURE 4 is a top plan detail view on the scale of FIGURES 1 to 3 showing the construction of a cradle frame part of the machine of FIGURES 1 and 2.
Figure 5:
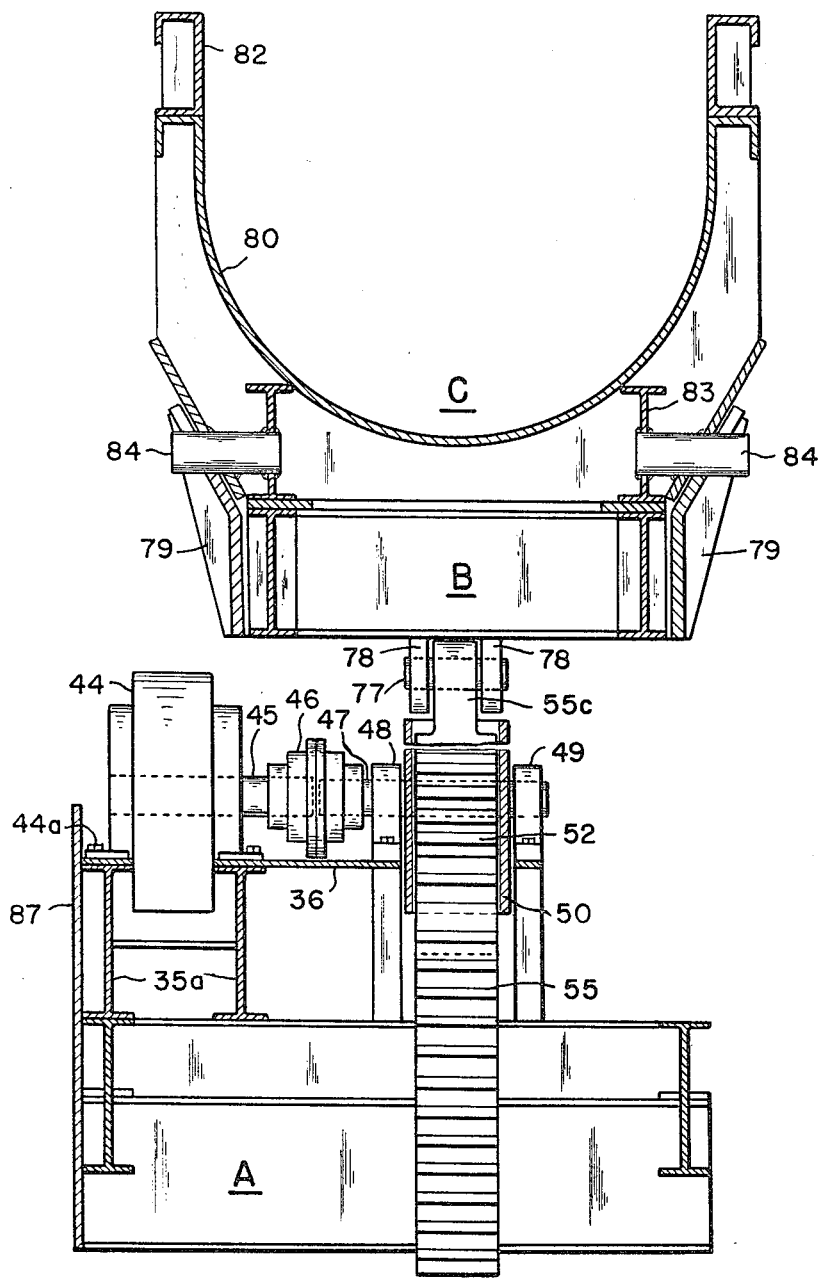
FIGURE 5 is an end section in elevation on an enlarged scale with respect to FIGURES 1 to 4, taken along the line V—V of FIGURE 1, and particularly illustrating mechanical means for raising and lowering the scrap box carrying cradle of FIGURE 4.

As shown particularly in FIGURES 1, 2 and 4, the cradle frame B has a longitudinally-extending pair of frame members 65 that are connected by cross-extending end members 66 and 70 and by intermediate, cross-extending members 67, 68 and 69 to define a rectangular frame that is centrally reinforced. In this connection, cross bracing 71 is also shown as extending between cross members 68 and 69. The pair of bifurcated pivot mounts 32 project downwardly from the front end portion of the frame B (see FIGURE 10) to receive pivot pins 31 and fit over wings 30 of the cradle frame B. Also, as shown in FIGURES 1, 4 and 5, the cradle frame B has a pair of backwardly-positioned, downwardly-extending, spaced-apart brackets or wings 78 that are carried between the cross members 67 and 68, and that pivotally carry an upper eyelet end portion 55c of the rack 55 by means of a pivot connecting pin 77. A backwardly-outwardly extending end bracket mount 74, reinforced by side plates 73, carries a cross-extending, crane hook-receiving pin 75. This enables the cradle frame B to be independently swung or tilted, for example, in an emergency, if the rack and motor mechanism should become inoperative; this may be facilitated by knocking-out the connecting pivot pin 77. The coupling 46 (see FIGURE 6) may be a quick-disconnect type to facilitate independent tilt of the cradle B.

At its front end portion, a pair of upwardly-projecting, outwardly-upwardly sloped, wings or pieces 79 (see FIGURES 1, 3 and 5) on the cradle frame B serve to position the scrap box C adjacent its front end. Also, a pair of oppositely-positioned wings 76 project upwardly from the side members 65 (see FIGURES 1 and 4) adjacent the back end portion of the cradle frame B or in substantial alignment with the rack connecting pin 77 to position back end portion of the scrap box C therein. It will be noted that the wings 76 have forwardly-downwardly sloped, upwardly-open slots 76a which extend from their upper ends to removably-receive side trunnions 84 of the scrap box C. The scrap box C can be removed by sliding it slightly backwardly and upwardly out of position on the cradle B by the use of an overhead crane.

The scrap box C, as shown particularly in FIGURES 1, 2 and 3, is provided, adjacent its forward end portion, with a pair of side trunnions 89 having flanged ends and is provided at its back end with a pair of spaced-apart, backwardly-projecting wings 85 that carry a cross-extending crane-hook-receiving pin 86. Thus, crane hooks may be engaged on the trunnions 89 and on the pin 86 to raise and lower scrap box C into and out of position on the cradle B. In this connection, the scrap box C may be filled at a lower or floor level, then raised to position on the cradle frame B of the machine and, after it is emptied, may be returned to the floor level for refilling.

To maximize its carrying capacity, each scrap box C of open top and forward end construction is provided with upwardly-projecting side extensions 82 and, at its forward end, is provided with a projecting, delivery chute 81. As particularly illustrated in FIGURE 3, one or more and preferably two machines of my construction may be secured together for operating as a unit, in order that their cradle frames B and B' may selectively be tilted to discharge scrap or other charging material from scrap boxes C and C' into a given furnace, such as D, by merely moving the unit longitudinally on the track 16 to selectively align each of the scrap boxes with the open top portion or mouth of the furnace.

Figure 14:
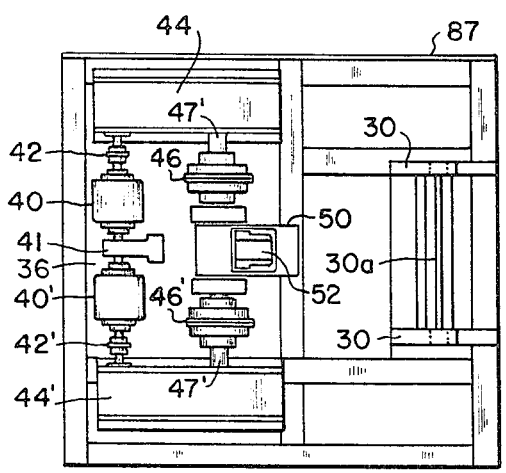
FIGURE 14 is a plan view on a greatly reduced scale with respect to FIGURE 6 and showing a dual type of drive for the tilting mechanism.

In FIGURE 14, I have illustrated a modified construction in which a pair of drive motors 40 and 40' are utilized for raising and lowering the rack 55. Both motors are shown controlled by the same brake 41, but the power from each passes through separate gear reduction units 44 and 44' to opposite ends of drive shaft 47' which carries the actuating pinion 52. Such an installation may be used where additional power is required in view of an an increase in size and capacity of the cradle B and of the scrap box C that is to be carried thereby.

Although for the purpose of illustration I have shown and described specific embodiments of my invention, it will be apparent to those skilled in the art that various modifications and changes may be made without departing from its spirit and scope, as indicated by the claims.

I claim:

1. In a charging machine for a metal melting furnace having a carriage frame for movement into and out of a charging position with respect to the furnace and having a cradle frame swingably-mounted adjacent its front end on the carriage frame for movement between substantial horizontal and forwardly-tilted positions on and with respect to the carriage frame and adapted to carry a scrap box thereon, the improvement which comprises: a structure on the carriage frame adjacent its back end portion, motor drive means securely-mounted in an operating relation on said structure, a pair of bearing stands secured on said structure adjacent said motor drive means, a drive shaft rotatably-carried on a transverse axial plane by said stands and operatively-connected to said motor drive means for actuation thereby, a swing housing pivotally-mounted adjacent its back end portion on said drive shaft between said stands, said swing housing having open top and bottom end portions, a pivot mount fixedly-secured on a back end portion of the cradle frame, a vertically-extending rack member having its upper end pivotally-carried by said pivot mount for up and down movement within said housing and having a smooth front face and an opposed toothed back face along its lower end portion, said rack projecting downwardly through the open top end portion in alignment with the open bottom end portion of said swing housing with its toothed face in meshing engagement with said pinion for up and down actuation thereby, a group of at least three flanged guide roller means rotatably-carried within said housing adjacent a front end portion thereof and in substantial vertical alignment with respect to each other, a central guide roller means of said group being operatively-positioned on the transverse axial plane of said drive shaft and pinion in an opposed relation with said pinion and in engagement with the smooth front face and with adjacent opposite side edges of said rack, a top roller means of said group being operatively-positioned in a spaced relation above said central roller means and in engagement with the front smooth face and with adjacent opposite side edges of said rack, a bottom guide roller means of said group being positioned in a spaced relation below said central roller means and in engagement with the smooth front face and with adjacent opposite side edges of said rack, and said group of roller means being rotatably-positioned within said housing for positively-operatively maintaining said rack in meshing engagement with said drive pinion and in a non-pivotal operating relation within said housing during its up and down movement within said housing and during swinging movement imparted to said housing by the up and down movement of said rack.

2. In a charging machine as defined in claim 1 wherein said rack has opposed front and back flanges along its lower end portion that provide said front and back faces and the adjacent opposed side edges thereof.

3. In a charging machine as defined in claim 2 wherein, each of said guide roller means has a shaft extending across within said housing, has a spool body provided with a central portion engaging the smooth front face of said rack, and has a pair of spaced-apart side flanges engaging opposite side edges of said rack.

4. In a charging machine as defined in claim 2 wherein, at least one of said guide roller means has a shaft extending transversely across said housing, has a spacer sleeve positioned on said shaft and has a pair of radially-projecting flange end portions journaled with respect to said shaft adjacent opposite end portions of said spacer sleeve, said spacer sleeve is adapted to engage said smooth front face of said rack, and said flange end portions are adapted to engage adjacent opposite side edges of said rack.

5. In a charging machine as defined in claim 3 wherein, said drive shaft extends transversely through said housing vertically-centrally of its back end portion, and means rotatably-positions said group of guide roller means within said housing along the front end portion thereof to define a central-vertical pass with said drive pinion along which said rack extends.

References Cited

UNITED STATES PATENTS

| 3,161,437 | 12/1964 | Le Tourneau | 298—19 |
| 3,223,257 | 12/1965 | Kinkopf | 214—18 |

FOREIGN PATENTS

| 22,931 | 7/1930 | Australia. |
| 500,194 | 1/1939 | Great Britain. |

ROBERT G. SHERIDAN, *Primary Examiner.*